United States Patent
Klug

(10) Patent No.: US 9,087,219 B2
(45) Date of Patent: Jul. 21, 2015

(54) CIRCUIT WITH A PLURALITY OF MODES OF OPERATION

(75) Inventor: Franz Klug, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1342 days.

(21) Appl. No.: 12/139,711

(22) Filed: Jun. 16, 2008

(65) Prior Publication Data

US 2009/0313461 A1    Dec. 17, 2009

(51) Int. Cl.
*G06F 21/74*    (2013.01)
*G06F 21/72*    (2013.01)

(52) U.S. Cl.
CPC ............... *G06F 21/74* (2013.01); *G06F 21/72* (2013.01)

(58) Field of Classification Search
CPC ......... G06F 21/72; G06F 21/74; G06F 2/771; G06F 21/71
USPC ................................................. 713/166, 164
See application file for complete search history.

(56) References Cited

U.S. PATENT DOCUMENTS

| | | | |
|---|---|---|---|
| 5,201,000 A * | 4/1993 | Matyas et al. | 380/30 |
| 5,301,312 A * | 4/1994 | Christopher et al. | 714/32 |
| 6,419,159 B1 * | 7/2002 | Odinak | 235/492 |
| 6,502,116 B1 * | 12/2002 | Kelly et al. | 708/250 |
| 6,678,825 B1 * | 1/2004 | Ellison et al. | 726/17 |
| 7,277,999 B1 * | 10/2007 | Agesen et al. | 711/163 |
| 7,607,032 B1 * | 10/2009 | Marek et al. | 713/300 |
| 7,929,701 B1 * | 4/2011 | Sprunk et al. | 380/277 |
| 2004/0225885 A1 * | 11/2004 | Grohoski et al. | 713/189 |
| 2004/0252841 A1 * | 12/2004 | Henry et al. | 380/277 |
| 2014/0006739 A1 * | 1/2014 | Dixon et al. | 711/163 |

FOREIGN PATENT DOCUMENTS

WO    WO-00/76117 A1    12/2000
WO    WO-2008/068704 A2    6/2008

* cited by examiner

*Primary Examiner* — Jung Kim
*Assistant Examiner* — Thomas Ho
(74) *Attorney, Agent, or Firm* — Schiff Hardin LLP

(57) ABSTRACT

A circuit capable of being operated in a first and a second mode of operation comprises a storage location adapted to store at least a first state, a second state and a third state, wherein the circuit is adapted to switch to the first mode of operation when the storage location acquires the first or the third state, and wherein the circuit is adapted to switch to the second mode of operation when the storage location acquires the second state.

9 Claims, 2 Drawing Sheets

CIRCUIT WITH A PLURALITY OF MODES OF OPERATION

TECHNICAL FIELD

Embodiments according to the present invention relate to circuits capable of being operated in a plurality of modes of operation, which might, for instance, offer different levels of security or different levels of resistances with respect to attacks.

Circuits and integrated circuits are today applied in many fields of technology. The variety of these fields is enormous, as circuits and integrated circuits are not only used for sensing influences, taking measurements, carrying out calculations and other data manipulations, but also comprise implementations of highly complex algorithms which may, for instance, be employed in the field of what is usually referred to as information technology.

Circuits and integrated circuits are, for instance, often employed in the field of security-related applications, which may comprise encryption, digital signing and further processing of information. Other security-related applications comprise access control systems, privileges, access or rights management systems and systems protecting other pieces of information, properties, goods, rights or privileges from being accessed or taken by unauthorized persons. These and other systems are sometimes referred to as security systems.

Due to the values associated with pieces of information, privileges, rights, access possibilities, goods or other values, circuits and integrated circuits employed in the field of security-related applications frequently undergo attacks to gain unauthorized access to these values secured by a respective circuit or integrated circuit.

As a consequence, a demand exists to increase security or to strengthen circuits and integrated circuits in view of attacks which may be carried out so as to gain information or other privileged data to overcome security systems used for protecting values.

SUMMARY

Embodiments according to the present invention are based on the finding that a security level or a resistance level in view of attacks on a circuit can be increased in the case of a circuit capable of being operated in at least a first mode and a second mode of operation, wherein the circuit is adapted to switch to a respective mode of operation based on a state stored in a storage location, by switching the circuit to the first mode of operation when the storage location acquires a first state corresponding to the first mode of operation, or a third state, and by switching to the second mode of operation when the storage location acquires a second state corresponding to the second mode of operation. By also switching to the first mode of operation, which might, for instance, offer a higher level of security or a higher level of resistance in view of attacks on the circuit when the storage location acquires the third state, which usually does not correspond to the first or second mode of operation, a burden for an attacker on the circuit, may, for instance, be increased in the case of employing an embodiment according to the present invention.

BRIEF DESCRIPTION OF THE DRAWINGS

In the following, embodiments according to the present invention will be described in more detail with reference to the appended figures.

DETAILED DESCRIPTION OF EMBODIMENTS

Figure 1:
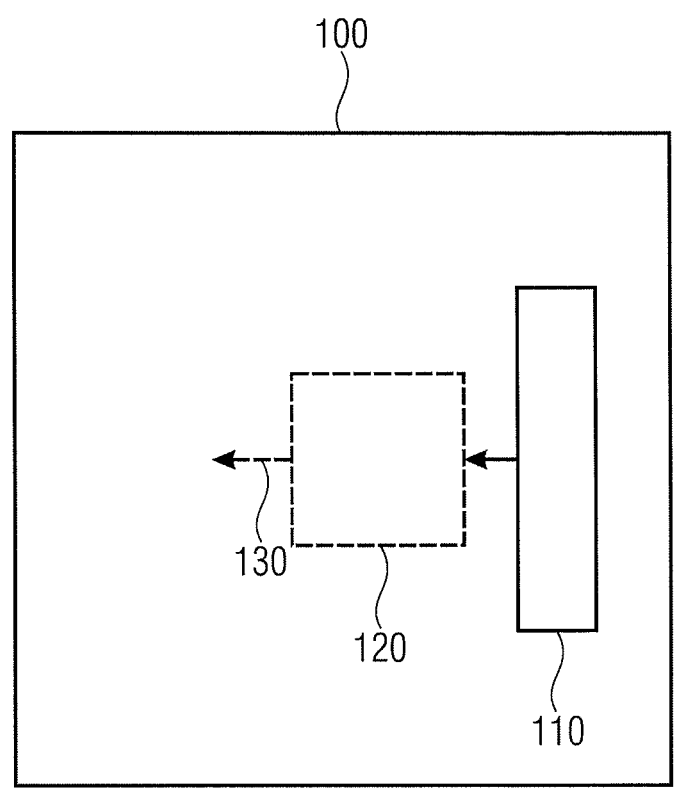
FIG. 1 shows a block diagram of an embodiment according to the present invention.

In the following, a first embodiment according to the present invention will be described with reference to FIGS. 1 and 2.

Circuits, integrated circuits and electronic devices are applied in many fields of technology ranging, for instance, from data acquisition, data transmission, simple calculations and manipulations to implementations of highly complex data processing procedures. Examples of complex data manipulation procedures can be found, for instance, in the field of cryptography and cryptoanalysis.

As the latter two examples can be found in the field of protecting data and other information from unauthorized access, these examples underline that circuits, integrated circuits and other electronic devices are employed in the field of security systems, such as security management systems, rights management systems and privilege management systems controlling access to data, information, restricted areas, goods, privileges or any other object representing a certain value, so that the respective objects are secured by one of the above systems. Examples can be found for instance in the field of access control systems or access management systems intended to prevent unauthorized access to a restricted area such as a company's business premises, a department, laboratory or other test facilities or other restricted areas. Other examples can be found in privilege, access or rights management systems intended to control and to restrict access to privilege information data such as confidential emails, confidential files, confidential documents, access to accounts and other classified information.

Circuits and integrated circuits comprising these security systems are often based on distributed circuits employing integrated circuits such as electronic tokens, smartcards, chip cards or other electronic devices, on the one hand, and corresponding components (e.g. a card reader), on the other hand. Due to the value of the goods protected by these circuits and integrated circuits, they are subject to attacks ranging from simple trial-and-error attempts to break a code to highly sophisticated attacks involving a detailed analysis of the layout of the integrated circuit or circuit, manipulation of the environmental conditions during the operation, and even physical attacks on the circuit or integrated circuit itself, for instance, by etching or removing certain parts of the circuit often accompanied by direct physical manipulation of the operation of the circuit by applying a laser, voltage strobes or other interferences. Other attack scenarios comprise manipulation of a program running on a processor comprised in the circuit or integrated circuit or a processor of which the circuit or integrated circuit is a part.

As a consequence, there exists a demand to strengthen the security of many circuits and integrated circuits and to make attacks on these circuits more difficult by employing security counter measures and security schemes.

In many cases a circuit or integrated circuit comprises a storage location, such as a register or control register, to which information can be written which determines a mode of operation of the circuit or integrated circuit. In such circuits an attack might for instance be targeted at the storage location controlling the mode of operation of the circuit, by altering or manipulating the state of the storage location. As outlined before, this may be achieved by employing a laser to directly alter or influence the content of the storage location or by employing a manipulated programming of the circuit or integrated circuit to carry out the manipulation based on commands of a program executed by the circuit itself. As a consequence, information about the processes of the circuits may for instance be leaked by attack strategies such as (basic) power analysis, differential power analysis or timing analysis of calculations of the circuit, which leads to processed or raw data being directly disclosed.

FIG. 1 shows a block diagram of a circuit 100 according to an embodiment of the present invention comprising a storage location 110. The circuit 100 is capable of being operated in a plurality of modes of operation comprising at least a first and a second mode of operation depending on a state acquired by the storage location 110. The circuit 100 is configured to switch to the first mode of operation when the storage location acquires a first state corresponding to the first mode of operation. Moreover, the circuit 100 is adapted to switch to the second mode of operation when the storage location 110 acquires a second state corresponding to the second mode of operation, which is different from the first state.

According to an embodiment of the present invention, the storage location is furthermore capable of acquiring at least a third state, which need not be associated with any mode of operation. This may for instance be due to the fact that the storage location is capable of storing or acquiring more states than are necessary to address each of the different modes of operation of the circuit 100. When the storage location 110 acquires the third state, the circuit 100 is adapted to switch to a defined or predefined mode of operation, for instance, the first mode of operation which may, for instance, offer a higher security level or a higher resistance level with respect to an attack than the second mode of operation. Examples of different modes of operation offering different security levels or different resistance levels with respect to attacks on the circuit 100 will be described in more detail in the further course of the description. Moreover, the first mode of operation may for instance be a mode of operation in which at least parts of the operation of the circuit 100 are halted such that no data processing or only a restricted data processing is carried out by the circuit 100.

In embodiments according to the present invention, the storage location 110 may for instance be a register, a control register or a special function register (SFR) controlling the operation of a circuit 100. Naturally, the storage location 110 may also be part of a cache memory or another memory comprising more storage locations than just the storage location 110. The technology underlying the storage location 110 may for instance be that of a dynamic random access memory (DRAM), that of a static random access memory (SRAM), that of a non-volatile memory (NVM), or any other technology allowing both, at least a one-time storage of data to and multiple read-outs of data from the storage location 110.

Embodiments according to the present invention are based on the finding that a security level or a level of resistance with respect to an attack on the circuit 100 can be increased by switching the circuit 100 to a mode of operation (first mode of operation) offering a higher security level or a higher resistance level with respect to an attack when the state of a storage location 110 does not correspond to the state (explicitly) associated with any of the intended modes of operation according to the specification of the device. As a consequence, deliberate or accidental manipulation of the content of the storage location 110 will in many cases lead to a strengthening of the circuit 100 against the present attack.

Embodiments according to the present invention are based on the fact that many registers and storage locations offer widths of n bits, wherein n is a positive integer, for instance 2 to 8, 10, 12, 14, 16, 20, 24, 32 or 64. Each of these registers or storage locations 110 offers $2^n$ potential states storable to the storage location. However, the number m of required states, wherein m is also a positive integer, required to encode the different modes of operation is often significantly smaller than the number of potential states ($m<2^n$). Hence, this approach is based on a situation in which the n bits are not completely employed in coding the different modes of operation.

In other words, the storage location or register 110 is adapted to store at least the sum of a first number of states and a second number of states, wherein each state of a first number of states corresponds to exactly one mode of operation of a plurality of modes of operation, and wherein a predetermined mode of operation is selected when the state of the register 110 is one of the second number of states. In many embodiments according to the present invention the first number is at least 3, and the second number is at least 1, so that the register is capable of storing at least 4 different states. The states of a first number of states are not only different from one another, but are also different from the states of the second number of states. Naturally, the states of a second number of states are also different from one another and from the states of the first number of states.

Moreover, in embodiments according to the present invention the register 110 or the storage location 110 is capable of exactly storing the sum of the first number of states and the second number of states. In the above case, all states of the storage location 110 correspond to "defined modes of operation". Alternatively or additionally, the second number is usually larger than the first number in embodiments according to the present invention. For instance, the second number may be equal to or larger than double the first number of states, equal to or larger than three times the first number of states or equal to or larger than N times the first number of states, wherein N is a positive integer being equal to or larger than 4.

As the predetermined mode of operation or the first mode of operation offers a higher security level or a higher resistance level with respect to an attack, an attacker will have to accept an increased risk that the attack itself will result in a less promising, more difficult starting point for this very attack. As a consequence, the probability of a successful random attack will be lowered and the number of necessary attempts is very likely to rise.

Hence, embodiments according to the present invention offer the possibility of switching into a more secure mode of operation when the state stored in the storage location 110 or the register 110 indicates an "invalid code". The predetermined or first mode of operation hence is less critical in terms of security concerns than further modes of operation. The reason for such an invalid code stored in the storage location 110 may for instance be an attack (e.g. via a laser) or an incorrect or false programming via a software.

Embodiments according to the present invention offer a more secure or a stronger implementation of circuits in view of attacks at comparably low costs. Moreover, in some embodiments according to the present invention, a required area of the chip for the circuit 100, which is also referred to as chip area overhead, and/or a required additional runtime for security procedures, which is also referred to as runtime overhead, can be saved, as a modification or verification of security-related (control) registers typically requires a significant effort in terms of writing, reading, comparing the stored values, or even a double implementation of the security-related components tying up significant resources like chip area and access time. In other words, by simply employing a few bits more in terms of the storage location 110 or the register 110, the security of the circuit 100 may be increased.

In embodiments according to the present invention, the states of the first number of states corresponding to different modes of operation of the circuit 100 are in many cases not consecutively numbered in terms of the values represented by the bits in the storage location 110. As will be outlined in more detail in the context of FIG. 2, the values corresponding to the different states, which are associated with different modes of operation need not be consecutively numbered in terms of their binary representations, as, for instance, a specific bit of the register 110 may be directly used for activating or deactivating one or more components of the circuit 100. Hence, in these cases, at least two values associated with two states corresponding to two different modes of operation exist such that an absolute value of the difference of the two values is larger than 1, and that no value corresponding to a mode of operation other than the first mode of operation or the predetermined mode of operation lies between the two values. An example of this will be laid out in more detail in the context of FIG. 2.

In further embodiments according to the present invention, the circuit 100 may further comprise a switching circuit 120 as an optional component coupled to the storage location 110. The switching circuit 120 may be adapted to determine the state of the storage location 110, for instance by reading out its value. Then, the switching circuit 120 may compare the value readout from the storage location 110 to a list of values corresponding to the states of the first number of states. In this case, the switching circuit 120 may be adapted to provide an optional switching signal 130 indicating the mode of operation, which may be identical to the value stored in the storage location 110. However, the switching circuit 120 may also optionally provide one or more signals activating or deactivating data switches, multiplexers, or other components of the circuit, or may alter the mode of operation of the circuit 100 in a different manner.

If the value readout from the storage location 110 is not comprised in the list mentioned above, the switching circuit 120 will generate a switching signal corresponding to a predetermined mode of operation of a plurality of modes of operation as outlined above. Optionally the switching circuit may provide the value read from the storage location 110 in an encoded or coded way as the switching signal 130. In the case of a switching circuit 120 being capable of providing one or more signals to activate or deactivate the components mentioned above, these signals are generated according to the predetermined mode of operation.

The switching circuit 120 as well as the entire circuit 100 may be implemented as an integrated circuit, a discrete circuit or a combination of both. Moreover, an embodiment of a method according to the present invention may also be implemented as a software or firmware program stored in a corresponding memory and carried out by a processor. In this case, determining a state as well as comparing values or states may comprise reading from and writing to implementation-specific addresses of a memory, or other implementation-specific procedures.

Figure 2:
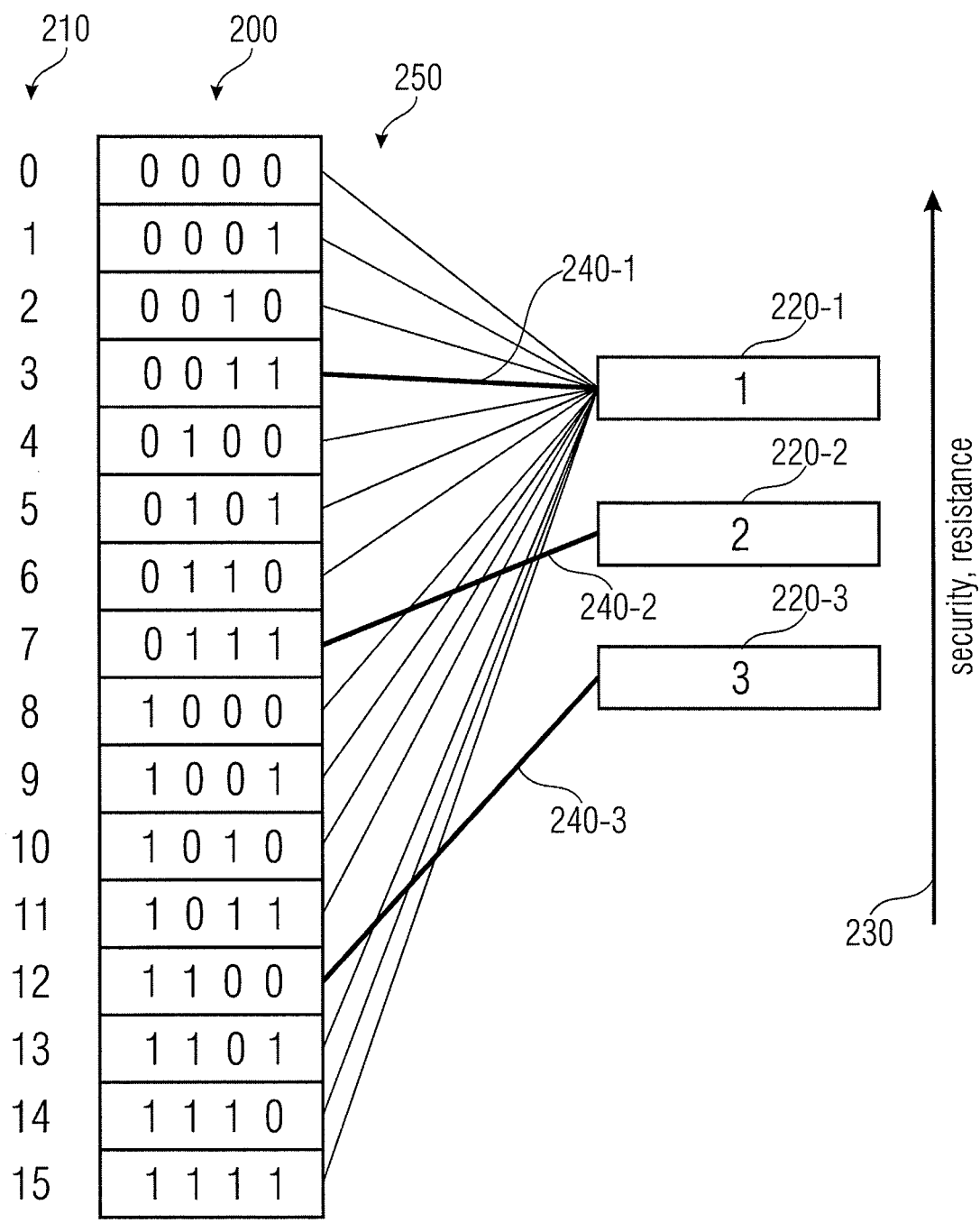
FIG. 2 schematically illustrates switching to different modes of operation based on a storage location comprising four bits.

FIG. 2 schematically illustrates switching the circuit 100 to different modes of operation depending on the state of a storage location or register 110 according to an embodiment of the present invention. However, the embodiment illustrated in FIG. 2 is based on the implementation details and specifications of these circuits described in the context of FIG. 1.

Here, the storage location 110 comprises 4 bits capable of acquiring values in the range from 0 (=0000) to 15 (=1111), wherein the values given in the brackets are the binary representations. On the left-hand side of FIG. 2, the 16 different values 200 in the binary representation are shown along with their corresponding decimal representations 210.

On the right-hand side of FIG. 2, three modes of operation 220-1 (mode 1), 220-2 (mode 2) and 220-3 (mode 3) are illustrated by three rectangles. As illustrated by an arrow 230 in FIG. 2, mode 1 comprises a higher security or resistance level than mode 2 and mode 3, while mode 2 comprises a higher security or resistance level than mode 3.

As indicated by the bold lines 240-1, 240-2 and 240-3, mode 1 220-1 is associated with a state 200 corresponding to the decimal value 3 as an intended value for switching the circuit 100 to mode 1. The state 200 corresponding to the decimal value 7 is associated with mode 2 220-2, while the state 200 corresponding to the decimal value 12 is associated with mode 3 220-3. Accordingly, these three states having the decimal values of 3, 7, 12 are the states belonging to the first number of states as described above. In the embodiment shown in FIG. 2, the other states 200 having decimal values 0, 1, 2, 4, 5, 6, 8, 9, 10, 11, 13, 14, 15 belong to the second number of states. For all these states, the associated or predetermined mode of operation of the plurality of modes of operation 220 is the first mode 220-1 as illustrated by the thin lines 250 in FIG. 2.

As indicated, FIG. 2 represents an embodiment according to the present invention in which all potential states of the register or storage location 110 are attributed to a mode of operation. In other words, the first number is equal to 3 corresponding to the values 3, 7, 12, and the second number is equal to 13 corresponding to the other states 200, so that the overall number of states of this storage location 110 is exactly equal to the sum of the first number and the second number. Moreover, the values of the states associated with the three modes of operation according to the specification of the circuit 100 are not consecutively numbered. Apart from the fact that 3, 7 and 12 are not consecutive integers, between the value of 3 and 7 there is no other of the associated values of the first number of states (which would be 12), and the absolute value of the difference of the two values of the corresponding states is $4=|7-3|=|3-7|$, as outlined before.

In yet other words, in the embodiment shown in FIG. 2 the first state corresponds to the value of 3, the second state to the value of 7 and the third state, for instance, to the value of 4.

Furthermore, FIG. 2 shows an embodiment according to the present invention in which a ratio between the second number of states (13) and the first number of states (3) is more than 4. As in the embodiment shown in FIG. 2, only three different modes of operation 220 exist, the number of bits required to switch between the different modes of operation is 2 in this case. However, as the register 110 comprises four bits, the previously mentioned ratio is more than $4=2^2$. In embodiments according to the present invention, the ratio between the second number of states and the first number of states is often equal to or larger than 2, which is, however, no requirement. With an increasing ratio an increased level of security against random attacks and other attacks on the storage location or register 110 is achievable.

Before describing further embodiments according to the present invention, wherein the emphasis of the description will be laid upon the different modes of operation, it should once again be pointed out that embodiments according to the present invention are applicable to any circuits with security-related or security-critical applications. Such circuits may be formed as integrated circuits or security devices comprising one or more integrated circuits. An integrated circuit or circuit may, for instance, be a smartcard, a chip card, a processor, an application-specific integrated circuit (ASIC) or an integrated circuit to be implemented in a security token. In the case of a circuit for a smartcard or a chip card, the circuit may for instance be a chip card controller, and the storage location 110 may be part of the corresponding control memory or control register of the chip card controller. Examples of processors are, apart from central processing units (CPU), mathematical processors and crypto processors which comprise arithmetic logical units (ALU) capable of highly effectively and/or securely carrying out specific, complex mathematical operations, like encryption, decryption, calculation of hash values and other operations.

Embodiments according to the present invention offer the possibility of secure handling of intentionally or accidentally false inputs into a control register as outlined before. In this case the respective register (e.g. a special-function register) will be "reset" to a secure value corresponding to the predetermined mode of operation.

In the case of an embodiment according to the present invention, a circuit 100 is capable of cloaking or disguising data exchanged with another component, such as a further circuit or a chip card reader, by employing a transfer mask so that the exchanged data is protected against simple sniffing during the exchange. Such a transfer mask may for instance be exclusively-ORed (XOR) with the data to be transferred to disguise or to cloak the real data. In this case, the transfer mask is typically a binary pattern comprising only zeros and ones with which the data to be transferred is XOR-ed prior to and after the transfer so that the influence of the transfer mask is eliminated after reception the masked data by the receiving component.

According to an embodiment of the present invention the circuit 100 may be adapted to modify a frequency of the changes of the transfer mask depending on a control register, for instance, comprising four bits. In this case the different modes of operation correspond to modes with different frequencies of the change of the transfer mask. The storage location 110 is in this case the 4-bit long control register. The valid states coded in four bits may for instance be the values 15 (=1111) associated with a change of a transfer mask with each cycle of a clock signal, 7 (=0111) associated with changing the transfer mask every 4 clock cycles, 3 (=0011) associated with changing the transfer mask every 16 clock cycles, 1 (=0001) associated with changing the transfer mask every 64 clock cycles, and 0 (=0000) associated with never changing the transfer mask or not using a transfer mask at all. Hence, in this case, the five states mentioned belong to a first number of states.

When, however, the control register 110 is supplied with an incorrectly coded state corresponding to a value other than the values mentioned above, the circuit 100 will be switched to the mode of operation corresponding to the most frequent mask changes. In other words, in this implementation any other value will be interpreted as the state corresponding to the decimal value 15 (=1111) so that the transfer mask is changed with every clock cycle. As a consequence, an attacker will have to take into account an increased risk that an attack will almost always lead to a more difficult starting location for this very attack. Hence, the probability of a successful random access will be significantly lowered, and the number of necessary attempts will probably rise dramatically.

The different transfer masks as well as the masks and the keys for blinding may, for instance, be determined using a pseudo random number generator or a true random number generator. Naturally, embodiments according to the present invention can be implemented with a different number of modes of operation or frequencies of changes of the transfer mask, with a longer or a shorter register as the storage location 110 or with a different coding for the respective frequency of mask changes.

In a similar embodiment according to the present invention, which is strengthened or hardened against a differential power analysis attack, a circuit 100 according to an embodiment of the present invention may be implemented with different modes of operation corresponding to different frequencies of a mask change for an internal use of the circuit 100. Such a circuit 100 may employ—as a counter measure strategy against a differential power analysis—a masking of the respective input data prior to the calculations and a demasking of the output of the calculations after the mathematical procedures have been applied. Depending on implementation details, not all potential algorithms might be capable of being implemented in such a way.

According to a further embodiment of the present invention employing a further counter measure strategy against differential power analysis which is similar to masking as previously described, circuits 100 may involve an algorithmic modification such that a cryptographic operation occurs on data that is related to the actual value by some mathematical relationship that survives the cryptographic operation. This technique is called blinding and very often implies an algorithm that is based on number theory, such as factoring or discrete logarithms. In embodiments according to the present invention employing this technique, the circuit may be capable of being operated in different modes of operation corresponding to different frequencies of key changes of the underlying cryptographic function.

According to a further embodiment of the present invention, the circuit 100 may be a symmetric crypto processor, and the storage location 110 may in this case be a crypto processor control register. Such an embodiment according to the present invention may for instance comprise 10 modes of operation which are selected based on the register 110 comprising 5 bits. In this embodiment according to the present invention the state corresponding to a value 0 (=00000) may be associated with a mode of operation indicating that no cryptographic mode has been selected. This mode of operation may be the predetermined mode of operation and can further serve as a reset mode to halt, interrupt or restart the processor in case of an invalid value corresponding to a state not belonging to the first number of states. Selecting these modes may make it more difficult for an attacker to carry out a random attack.

The different mode of operation of such a cryptographic processor may for instance differ with respect to different cryptographic algorithms, key lengths and frequencies for key changes as described above. For instance, the cryptographic processor may, for instance, switch between DES, AES, IDEA, CAST and other algorithms based on elliptic curves. Moreover, in terms of one-way hash-functions, the processor 100 may switch between MD5, RIPE160, SHA1, SHA1a and SHA2. Naturally, in different embodiments other modes of operation, a subset of the modes mentioned above and other implementation-specific details may be implemented.

In a further embodiment according to the present invention, a control register 110 may switch the circuit 100 via the optional switching circuit 120 between different ALUs, one of which may, for instance, be highly effectively implemented but comprise low resistance against a differential power attack or other attacks, and one of which employs the so-called dual rail approach which is based on processing the data and the inverted data simultaneously to generate fewer or no power fluctuations depending on the data being processed. Moreover, according to an embodiment of the present invention, the circuit 100 may further be capable of activating so-called precharging or pre-discharging depending on the state of the corresponding control register 110. In the precharged mode of operation all the dual rail signal lines are initialized to a logical value 1 for each clock cycle prior to the actual algorithmic operation. In the case of a pre-discharged mode of operation, all the signal lines of the dual-rail architecture are initialized to a logical state corresponding to 0 for both signal lines each. In other words, employing the precharge or pre-discharge mode of operation in the beginning of each clock cycle will result in the signal line pair being in an "illegal state", since under normal conditions one of the two signal lines comprises an inverted signal level of the other.

In embodiments according to the present invention employing for instance two different ALUs, the different modes of operation may for instance comprise using the efficient ALU, using the strengthened ALU without precharging or pre-discharging, using the strengthened ALU with precharging and using the strengthened ALU with pre-discharging. As a predetermined mode of operation, the mode employing the strengthened ALU with pre-discharging may for instance be used. As the number of different modes of operation in this embodiment according to the present invention is 4, so that a register with at least 2 bits is required to designate all 4 modes as the first number of states is in this case 4, the register 110 should comprise at least 3 bits to store at least 8 different states. Naturally, the number of bits of the register 110 may even be higher, which will lead to the circuit 100 being even more secure against random attacks against the register 110 of the circuit 100. Moreover, in different embodiments a different number of ALUs, different modes of operation and other implementation-specific details may be implemented.

In a further embodiment according to the present invention, the circuit 100 may be operated in different modes of operation comprising different correlation values of power consumption to processed data. This may for instance be achieved by a (pseudo-) random activation of dissipative electrical elements comprising a sufficient noise level to mask fluctuations of the power consumption caused by the data processing. This can for instance be achieved by activating or deactivating resistive elements shunted in parallel, such as pn-junctions, ohmic resistors or other electrical elements which comprise physical noise sources (e.g. shot noise).

In such an embodiment according to the present invention, the different modes of operation may once again differ with respect to a potential bandwidth of power consumptions, a frequency of activating or deactivating certain dissipative elements. Depending on the application in mind, it might be advisable to be capable of switching between a low-power mode of operation with only a limited number of or no dissipative elements activated, which therefore reduces the overall power consumption but might reveal more information to a potential attacker, and modes of operation with a higher power consumption. As an example, it might be advisable to implement a mode of operation, for instance, for a short-term period only, in which the higher overall power consumption is a less important drawback compared to a strengthened security against attacks, such as, for instance, a long life time of a battery may be of less importance in the case of an attack.

Once again, depending on the implementation details, embodiments according to the present invention may differ with respect to a wide range of parameters such as the number of dissipative elements, frequencies of activation and deactivation and the bandwidth of power consumption fluctuations caused by the different elements being activated. In such a case the predetermined mode of operation might be the mode with highest and most frequent power fluctuations to mask traces of the data being processed in the power consumption as well as possible.

A further embodiment according to the present invention is a circuit 100 comprising both, a pseudo random number generator and a true random number generator. The true random number generator is typically a component which comprises an inherent physical noise source. An example is for instance a phase locked loop (PLL), a resistor or a tunnel junction (e.g. a reverse-biased pn-junction) which comprises a physical noise source such as the previously mentioned shot noise or other regularly occurring disturbances which are dominated by chance.

A pseudo random number generator, on the other hand, is often implemented as a linear feedback shift register (LFSR) based on a polynomial having a maximum length of a sequence of bits which for many applications shows a sufficiently useful statistical behavior. However, a pseudo random number generator is a deterministic system so that the output is essentially determined by an initialization vector provided to the pseudo random number generator.

However, the energy consumption of a pseudo random number generator is usually significantly lower than that of a true random number generator, since an amount of energy to be supplied to the physical noise source is in many cases significantly larger than that which is required for an efficient implementation of a pseudo random number generator. Therefore, it may be advisable to initialize a pseudo random number generator based on an initialization vector generated by the true random number generator. Depending on the security requirements of an application also in this case the frequency of an activation of the true random number generator to initialize the pseudo random number generator may be different in different modes of operation. As in the previously described embodiment according to the present invention with different frequencies for a change of a transfer mask, also in this embodiment according to the present invention different modes of operation with different frequencies of an initialization of the pseudo random number generator may be implemented, wherein the predetermined mode of operation is that with the highest number of initializations.

Depending on certain implementation requirements of embodiments of inventive methods, embodiments of the inventive methods can be implemented in hardware or in software. The implementation can be performed using a digital storage medium, in particular a disc, a CD or a DVD having electronically readable control signals stored thereon, which cooperate with a programmable computer or processor such that an embodiment of the inventive methods is performed. Generally, an embodiment of the present invention is, therefore, a computer program product with a program code stored on a machine-readable carrier, the program code being operative for performing an embodiment of the inventive method when the computer program product runs on the computer or processor. In other words, embodiments of the inventive methods are, therefore, a computer program having a program code for performing at least one of the embodiments of the inventive methods when the computer program runs on the computer or processor. A processor can be formed by a computer, a chip card, a smartcard, an application-specific integrated circuit (ASIC) or an integrated circuit (IC).

While the foregoing has been particularly be shown and described with reference to particular embodiments thereof, it will be understood by those skilled in the art that various other changes in the forms and details may be made without departing from the spirit and scope thereof. It is to be understood that various changes may be made in adapting to different embodiments without departing from the broader concept disclosed herein and comprehended by the claims that follows.

The invention claimed is:

1. A circuit adapted to be operated in a plurality of modes of operation, wherein each mode of operation has associated therewith a specific valid state, comprising:
a storage location adapted to store a number of states, which is larger than a number of valid states necessary to address the plurality of modes of operation, wherein the circuit is configured to be operated in one of the plurality of modes of operation depending on the state acquired by the storage location,
wherein the circuit is adapted to switch to the mode of operation associated with a specific valid state when the storage location acquires this specific valid state, and
wherein the circuit is adapted to compare a value read out from the storage location to a list of values corresponding to the valid states and to switch to a predetermined one of the plurality of modes of operation when the value read out from the storage location is not comprised in the list of values,
wherein the circuit is adapted such that a security level or a level of resistance with respect to attacks on the circuit is higher for the predetermined mode of operation than for another mode of operation, and
wherein
a) the circuit is adapted to process or transfer data to an external component, wherein the data is masked by a changeable mask during processing or transferring, or wherein the data is blinded based on a changeable key, wherein the different modes of operation differ with respect to at least one of a frequency of mask changes and key changes or with respect to at least one of a mask length and a key length, wherein the circuit is adapted such that the predetermined mode of operation corresponds to the highest frequency or the longest key;
b) wherein the circuit is adapted such that the different modes of operation comprise different correlations of power consumption and processed data, and such that the predetermined mode of operation comprises the lowest level of correlation; or
c) wherein the circuit comprises a true random number generator and a pseudo random number generator, wherein the circuit is adapted such that the true random number generator is used for initializing the pseudo random number generator, and wherein the circuit is adapted such that the different modes of operation correspond to different frequencies of the initialization of the pseudo random number generator, and wherein the predetermined mode of operation is that with the highest number of initializations.

2. The circuit according to claim 1, wherein the storage location is a register.

3. The circuit according to claim 2, wherein the register is a control register or a special function register.

4. The circuit according to claim 1, wherein the circuit is an integrated circuit.

5. The circuit according to claim 1, wherein the circuit is comprised in a processor, crypto processor or application-specific integrated circuit.

6. An apparatus for being operated in a plurality of modes of operations, wherein each mode of operation has associated therewith a specific valid state, comprising:
a storing means for storing a number of states, which is larger than a number of states necessary to address the plurality of modes of operation, wherein the apparatus is configured to be operated in one of the plurality of modes of operation depending on the state acquired by the storing means; and
a switching means for switching the apparatus to the first mode of operation associated with a specific valid state when the storage means acquires this specific valid state, and for comparing a value read out from the storing means to a list of values corresponding to the valid states and for switching the apparatus to a predetermined one of a plurality of modes of operation when the value read out from the storing means is not comprised in the list of values,
wherein the apparatus is adapted such that a security level or a level of resistance with respect to attacks on the apparatus is higher for the predetermined mode of operation than for another mode of operation, and
wherein
a) the apparatus is adapted to process or transfer data to an external component, wherein the data is masked by a changeable mask during processing or transferring, or wherein the data is blinded based on a changeable key, wherein the different modes of operation differ with respect to at least one of a frequency of mask changes and key changes or with respect to at least one of a mask length and a key length, wherein the apparatus is adapted such that the predetermined mode of operation corresponds to the highest frequency or the longest key;
b) wherein the apparatus is adapted such that the different modes of operation comprise different correlations of power consumption and processed data, and such that the predetermined mode of operation comprises the lowest level of correlation; or
c) wherein the apparatus comprises a true random number generator and a pseudo random number generator, wherein the apparatus is adapted such that the true random number generator is used for initializing the pseudo random number generator, and wherein the apparatus is adapted such that the different modes of operation correspond to different frequencies of the initialization of the pseudo random number generator, and wherein the predetermined mode of operation is that with the highest number of initializations.

7. A method for switching a circuit into one of a plurality of modes of operation, wherein each mode of operation has associated therewith a specific valid state, comprising:
determining a state of a storage location adapted to store a number of states, which is larger than the number of states necessary to address the plurality of modes of operation, wherein the circuit is configured to be operated in one of the plurality of modes of operation depending on the state acquired by the storage location;
switching the circuit to the mode of operation associated with a specific valid state when the determined state is the specific valid state; and
comparing a value read out from the storing means to a list of values corresponding to the valid states and switching the circuit to a predetermined of the plurality of modes of operation when the value read out from the storage location is not comprised in the list of values,
wherein the circuit is adapted such that a security level or a level of resistance with respect to attacks on the circuit is higher for the predetermined mode of operation than for another mode of operation, and wherein
a) the circuit is adapted to process or transfer data to an external component, wherein the data is masked by a changeable mask during processing or transferring, or wherein the data is blinded based on a changeable key, wherein the different modes of operation differ with respect to at least one of a frequency of mask changes and key changes or with respect to at least one of a mask length and a key length, wherein the circuit is adapted such that the predetermined mode of operation corresponds to the highest frequency or the longest key;
b) wherein the circuit is adapted such that the different modes of operation comprise different correlations of power consumption and processed data, and such that the predetermined mode of operation comprises the lowest level of correlation; or
c) wherein the circuit comprises a true random number generator and a pseudo random number generator, wherein the circuit is adapted such that the true random number generator is used for initializing the pseudo random number generator, and wherein the circuit is adapted such that the different modes of operation correspond to different frequencies of the initialization of the pseudo random number generator, and wherein the predetermined mode of operation is that with the highest number of initializations.

8. A non-transitory digital storage medium having stored thereon a computer program for performing, when running on a processor, a method for switching a circuit to one of a plurality of modes of operation, wherein each mode of operation has associated therewith a specific valid state, comprising:

determining a state of a storage location adapted to store a number of states, which is larger than the number of states necessary to address the plurality of modes of operation, wherein the circuit is configured to be operated in one of the plurality of modes of operation depending on the state acquired by the storage location;

switching the circuit to the first mode of operation associated with a specific valid state when the determined state is this specific valid state; and comparing a value read out from the storing means to a list of values corresponding to the valid states and switching the circuit to the predetermined one of the plurality of modes of operation when the value read out from the storage location is not comprised in the list of values, wherein the circuit is adapted such that a security level or a level of resistance with respect to attacks on the circuit is higher for the predetermined mode of operation than for another mode of operation, and wherein
a) the circuit is adapted to process or transfer data to an external component, wherein the data is masked by a changeable mask during processing or transferring, or wherein the data is blinded based on a changeable key, wherein the different modes of operation differ with respect to at least one of a frequency of mask changes and key changes or with respect to at least one of a mask length and a key length, wherein the circuit is adapted such that the predetermined mode of operation corresponds to the highest frequency or the longest key;
b) wherein the circuit is adapted such that the different modes of operation comprise different correlations of power consumption and processed data, and such that the predetermined mode of operation comprises the lowest level of correlation; or
c) wherein the circuit comprises a true random number generator and a pseudo random number generator, wherein the circuit is adapted such that the true random number generator is used for initializing the pseudo random number generator, and wherein the circuit is adapted such that the different modes of operation correspond to different frequencies of the initialization of the pseudo random number generator, and wherein the predetermined mode of operation is that with the highest number of initializations.

9. The circuit according to claim 1, wherein the storage location is adapted such that values corresponding to the specific valid states are not consecutive values when being arranged in an ascending order, such that a first value not corresponding to one of the valid states is arranged between a first value corresponding to a valid state and a second value corresponding to a valid state and such that a second value not corresponding to one of the valid states is arranged between the second value corresponding to a valid state and a third value corresponding to a valid state.

* * * * *